United States Patent
Lee et al.

(10) Patent No.: US 10,361,463 B2
(45) Date of Patent: Jul. 23, 2019

(54) BATTERY MODULE HAVING IMPROVED FASTENING STRUCTURE

(71) Applicant: LG CHEM, LTD., Seoul (KR)

(72) Inventors: Young-Ho Lee, Daejeon (KR); Jun-Yeob Seong, Daejeon (KR); Seong-Tae Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 190 days.

(21) Appl. No.: 15/558,891

(22) PCT Filed: Aug. 12, 2016

(86) PCT No.: PCT/KR2016/008935
§ 371 (c)(1),
(2) Date: Sep. 15, 2017

(87) PCT Pub. No.: WO2017/039180
PCT Pub. Date: Mar. 9, 2017

(65) Prior Publication Data
US 2018/0076487 A1    Mar. 15, 2018

(30) Foreign Application Priority Data

Sep. 2, 2015  (KR) .......................... 10-2015-0124321

(51) Int. Cl.
*H01M 10/42*    (2006.01)
*H01M 2/10*    (2006.01)
(Continued)

(52) U.S. Cl.
CPC ......... *H01M 10/4207* (2013.01); *H01M 2/10* (2013.01); *H01M 2/1072* (2013.01);
(Continued)

(58) Field of Classification Search
None
See application file for complete search history.

(56) References Cited

U.S. PATENT DOCUMENTS

2008/0138698 A1   6/2008  Ogami et al.
2010/0136420 A1*  6/2010  Shin ................... H01M 2/1077
                                                        429/178
(Continued)

FOREIGN PATENT DOCUMENTS

JP    2008-147045 A    6/2008
JP     2009-48965 A    3/2009
(Continued)

OTHER PUBLICATIONS

International Search Report issued in PCT/KR2016/008935 (PCT/ISA/210), dated Nov. 28, 2016.

*Primary Examiner* — Alix E Eggerding
(74) *Attorney, Agent, or Firm* — Birch, Stewart, Kolasch & Birch, LLP (57) ABSTRACT

A battery module according to an embodiment of the present disclosure includes a cell cartridge assembly including at least one battery cell and a plurality of stacking cartridges configured to respectively accommodate the at least one battery cell and arranged in layers in a height direction; and a sensing assembly mounted on at least one side of the cell cartridge assembly and configured to sense electrical characteristics of the at least one battery cell. Each of the stacking cartridges includes a bolt-assembling finger protruding from at least one corner area beyond other corner areas, and the bolt-assembling finger includes an assembly guide unit provided in a slot form. The sensing assembly includes a sensing assembly body provided in the form of a plate-shaped structure and having a plurality of sensing members mounted thereon, and an assembling plate integrally formed with the sensing assembly body and capable of being inserted into the assembly guide unit of the bolt-assembling finger.

13 Claims, 6 Drawing Sheets

(51) Int. Cl.
*H01M 2/20* (2006.01)
*H01M 10/48* (2006.01)

(52) U.S. Cl.
CPC ....... *H01M 2/1077* (2013.01); *H01M 2/1083* (2013.01); *H01M 2/20* (2013.01); *H01M 2/206* (2013.01); *H01M 10/42* (2013.01); *H01M 10/425* (2013.01); *H01M 10/4257* (2013.01); *H01M 10/48* (2013.01); *H01M 10/482* (2013.01); *H01M 2010/4271* (2013.01); *H01M 2220/20* (2013.01)

(56) References Cited

U.S. PATENT DOCUMENTS

| | | | |
|---|---|---|---|
| 2013/0108902 A1 | 5/2013 | Kristofek et al. | |
| 2013/0122339 A1 | 5/2013 | Chae et al. | |
| 2015/0037641 A1* | 2/2015 | Pinon | H01M 2/1077 |
| | | | 429/99 |
| 2015/0140380 A1 | 5/2015 | Kang et al. | |
| 2015/0303415 A1* | 10/2015 | Kayano | H01M 2/206 |
| | | | 429/159 |
| 2015/0303446 A1 | 10/2015 | Jung | |
| 2016/0268652 A1 | 9/2016 | Eom et al. | |

FOREIGN PATENT DOCUMENTS

| | | |
|---|---|---|
| JP | 2014-535140 A | 12/2014 |
| KR | 10-2008-0032287 A | 4/2008 |
| KR | 10-2010-0096920 A | 9/2010 |
| KR | 10-1047991 B1 | 7/2011 |
| KR | 10-2012-0063066 A | 6/2012 |
| KR | 10-1305224 B1 | 9/2013 |
| KR | 10-2014-0085273 A | 7/2014 |
| KR | 10-2014-01444473 A | 12/2014 |
| KR | 10-2015-0106026 A | 9/2015 |
| WO | WO 2015/080466 A1 | 6/2015 |

\* cited by examiner

BATTERY MODULE HAVING IMPROVED FASTENING STRUCTURE

TECHNICAL FIELD

The present disclosure relates to a battery module, and more particularly, to a battery module having stable fixing force between components.

The present application claims priority to Korean Patent Application No. 10-2015-0124321 filed on Sep. 2, 2015 in the Republic of Korea, the disclosure of which is incorporated herein by reference.

BACKGROUND ART

Recently, rechargeable secondary batteries have widely been used as energy sources for wireless mobile devices. Also, the secondary batteries have attracted attention as power sources for electric vehicles (EV) and hybrid electric vehicles (HEV), which have been proposed to solve air pollution caused by conventional gasoline vehicles and diesel vehicles using fossil fuels.

Small-sized mobile devices use one or a few battery cells per device, while middle- or large-sized devices, such as automobiles, use middle- or large-sized battery modules in which a large number of battery cells are electrically connected or battery packs in which a plurality of battery modules are connected, due to the necessity for high-output large-capacity batteries.

The middle- or large-sized battery modules may be manufactured to have as small a size and weight as possible. Thus, the middle- or large-sized battery modules may be stacked with a high integration density, and prismatic batteries or pouch-type batteries having a small weight to capacity ratio are mainly used as battery cells applied to the middle- or large-sized battery modules.

In particular, a pouch-type battery cell using an aluminum laminate sheet as an external member has lately attracted considerable attention due to advantages, such as a small weight, low manufacturing costs, and easy shape deformation.

In order for the middle- or large-sized battery modules to provide output and capacity required by a predetermined apparatus or device, a plurality of battery cells should be electrically connected in series, parallel, or a combination of series and maintain a stable structure against external force.

Since the middle- or large-sized battery module has a structure into which a plurality of battery cells are combined, when some of the battery cells suffer over-voltage, over-current, or over-heat, a sensing unit configured to sense and control the over-voltage, over-current, or over-heat is necessarily required. The sensing unit should be stably connected to the battery cells to provide reliable voltage/current information to a BMS.

In an example, a conventional battery module includes a cell cartridge assembly including battery cells and stacking cartridges configured to stack the battery cells. The cell cartridge assembly may be arranged in layers. The sensing unit may be coupled to one side of the cell cartridge assembly arranged in layers. A hook fastening method is frequently applied for the convenience of assembly.

However, in a battery module using the hook fastening method, the sensing unit is highly likely to be damaged during a hook fastening process, and there may be clearance in a hook-fastened portion due to tolerance, so that a fixed state of the sensing unit may become unstable.

Meanwhile, since the middle- or large-sized battery modules applied to automobiles are easily exposed to vibration and impact, the middle- or large-sized battery modules should have high structural and electrical stability. However, the conventional battery module has weak durability against impact and vibration because the fixed state of the sensing unit is unstable as described above.

DISCLOSURE

Technical Problem

The present disclosure is designed to solve the problems of the related art, and therefore the present disclosure is directed to providing a battery module including a sensing assembly, which may improve stability of a fastening structure between the sensing assembly and a cell cartridge assembly against impact and vibration.

Technical Solution

In one aspect of the present disclosure, there is provided a battery module including a cell cartridge assembly including at least one battery cell and a plurality of stacking cartridges configured to respectively accommodate the at least one battery cell and arranged in layers in a height direction, and a sensing assembly mounted on at least one side of the cell cartridge assembly and configured to sense electrical characteristics of the at least one battery cell. Each of the stacking cartridges includes a bolt-assembling finger protruding from at least one corner area beyond other corner areas, and the bolt-assembling finger includes an assembly guide unit provided in a slot form. The sensing assembly includes a sensing assembly body provided in the form of a plate-shaped structure and having a plurality of sensing members mounted thereon, and an assembling plate integrally formed with the sensing assembly body and capable of being inserted into the assembly guide unit of the bolt-assembling finger.

Each of the stacking cartridges may include an opening on at least one side thereof. The two bolt-assembling fingers may protrude forwardly with respect to the opening with the opening therebetween and be respectively provided in both corner areas of the stacking cartridge so that an indentation of which at least one side surface is concave may be provided in the cell cartridge assembly.

The sensing assembly body may be inserted into the indentation of the cell cartridge assembly with a plate surface of the sensing assembly body vertically erected. The assembling plates may be provided in plural. The assembling plates may protrude in two lateral directions with the sensing assembly body therebetween. The assembling plates may be spaced apart by a predetermined distance from one another in a height direction of the sensing assembly body and slidably inserted into assembly guide units of the bolt-assembling fingers.

The bolt-assembling finger may further include a first bolt through-hole through which a bolt is inserted in a vertical direction, and the assembling plate may have a second bolt through-hole configured to communicate with the first bolt through-hole.

The stacking cartridge may have a coupling protrusion at any one of an upper end portion and a lower end portion and have a coupling groove corresponding to the coupling protrusion at the other one thereof.

The stacking cartridge may include an upper frame and a lower frame provided to be capable of being assembled with each other up and down. Any one of the upper frame and the lower frame may include a hook, and the other thereof may include a hooking hole corresponding to the hook.

The sensing member may include a plurality of bus bars that respectively contact the electrode leads of the battery cells, which protrude from the cell cartridge assembly, and a circuit board electrically connected to one end of each of the plurality of bus bars.

The sensing member may further include connector terminals connected to the circuit board and to which an external device configured to measure electrical characteristics of the battery cell is connected.

The circuit board may be mounted in a center of a front surface of the sensing assembly body, and the plurality of bus bars may be arranged in multiple stages on both sides of the circuit board in a branched structure with the circuit board therebetween.

The sensing assembly may further include a thermistor mounting terminal installed through front and rear surfaces of the circuit board and the sensing assembly.

The cell cartridge assembly may further include an upper end plate and a lower end plate configured to respectively cover an uppermost end and a lowermost end of the plurality of stacking cartridges, and a band plate provided in the form of a strap having mechanical rigidity, the band plate having one end coupled to an upper end surface of the upper end plate and the other end coupled to a lower end surface of the lower end plate.

In another aspect of the present disclosure, there is also provided a battery pack including the above-described battery module.

In another aspect of the present disclosure, there is also provided a vehicle including the above-described battery module.

Advantageous Effects

According to one aspect of the present disclosure, a sensing assembly may be strongly coupled to a cell cartridge, thereby providing a battery module having improved structural and electrical stability against vibration and impact.

According to another aspect of the present disclosure, an assembly position of the sensing assembly is determined and held by bolt-assembling fingers of a cell cartridge assembly, thereby improving assembly convenience and accuracy.

BEST MODE

Embodiments described in the specification and configurations shown in the drawings are only a preferable embodiment of the present disclosure and do not represent all technical features of the present disclosure, so it should be understood that there may be various equivalents and modifications could be made thereto without departing from the scope of the disclosure.

Specific descriptions of well-known components and functions may be omitted so as to unnecessary obscure embodiments of the present disclosure.

The embodiments of the present disclosure are provided to fully convey the concept of the present disclosure to one skilled in the art, so that shapes and sizes of components in the drawings may be exaggerated, omitted, or schematically illustrated for clarity. Thus, a size or ratio of each component does not totally reflect an actual size or ratio.

Figure 1:
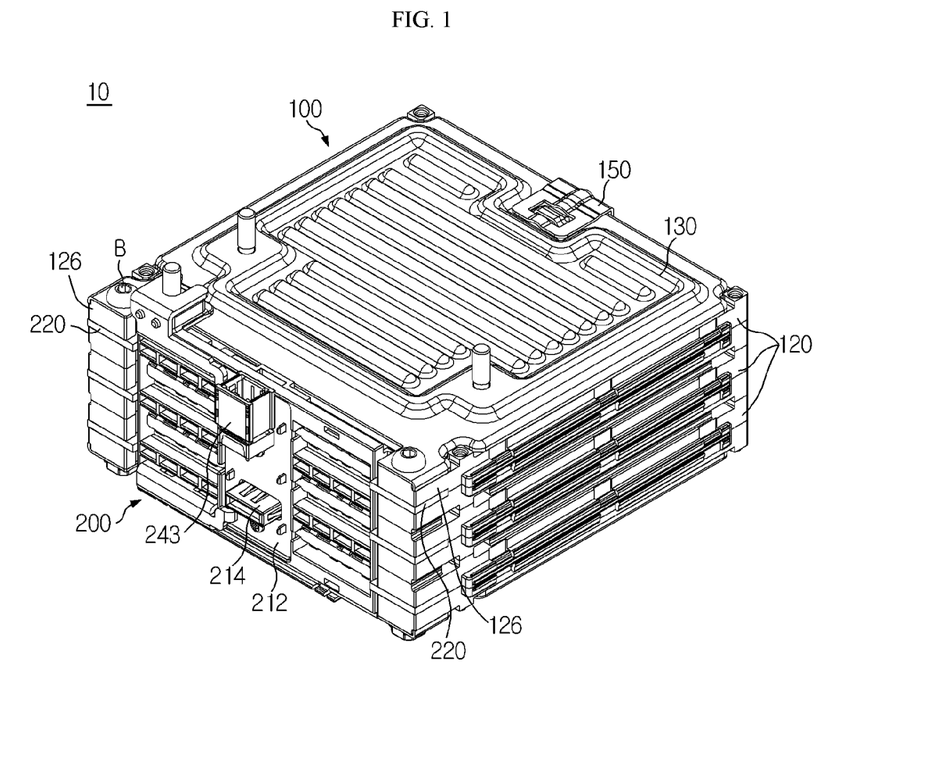
FIG. 1 is a perspective view of a battery module according to an embodiment of the present disclosure.
Figure 2:
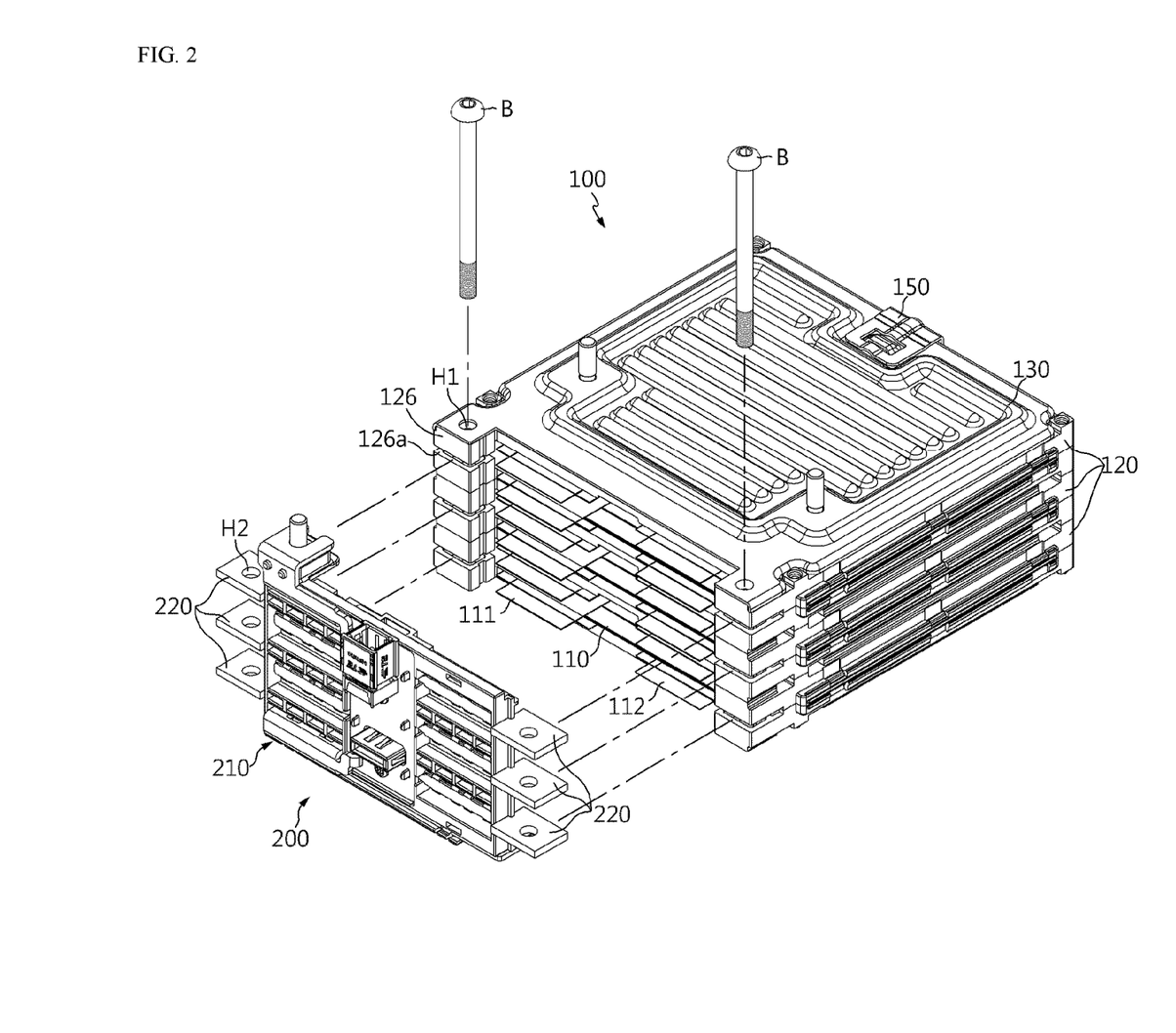
FIG. 2 is a partial exploded perspective view of FIG. 1.

FIG. 1 is a perspective view of a battery module according to an embodiment of the present disclosure, and FIG. 2 is a partial exploded perspective view of FIG. 1.

Referring to FIGS. 1 and 2, a battery module 10 according to an embodiment of the present disclosure includes a cell cartridge assembly 100 and a sensing assembly 200.

The cell cartridge assembly 100 may be a collection of battery cells 110, which includes a plurality of battery cells 110.

Here, the battery cells 110 included in the cell cartridge assembly 100 may be pouch-type battery cells 110. In this case, the pouch-type battery cells 110 may be stacked in one direction, for example, in a vertical direction as shown in FIG. 2.

Each of the pouch-type battery cells 110 may include electrode leads 111 and 112. The electrode leads 111 and 112 may include a positive electrode lead 111 and a negative electrode lead 112. Here, each of the electrode leads 111 and 112 protrudes to the outside of a pouch external member. In particular, the electrode leads 111 and 112 of each of the pouch-type battery cells 110 may protrude in a horizontal direction, and have bent end portions in a vertical direction. The end portions, which are bent in the vertical direction, may be in contact with bent portions of the electrode leads 111 and 112 of another battery cell 110. Also, two electrode leads 111 and 112, which are in contact with each other, may be fixed to each other by using a welding process. Thus, the battery cells 110 may be electrically connected in the cartridge assembly 100.

The cell cartridge assembly 100 may include stacking cartridges 120 to stack the pouch-type battery cells 110. The stacking cartridges 120 may be components configured to stack the battery cells 110. The stacking cartridges 120 may be configured hold the battery cells 110 and prevent motion of the battery cells 110. The stacking cartridges 120 may be configured to be capable of being stacked so as to guide the assembly of the battery cells 110.

Figure 3:
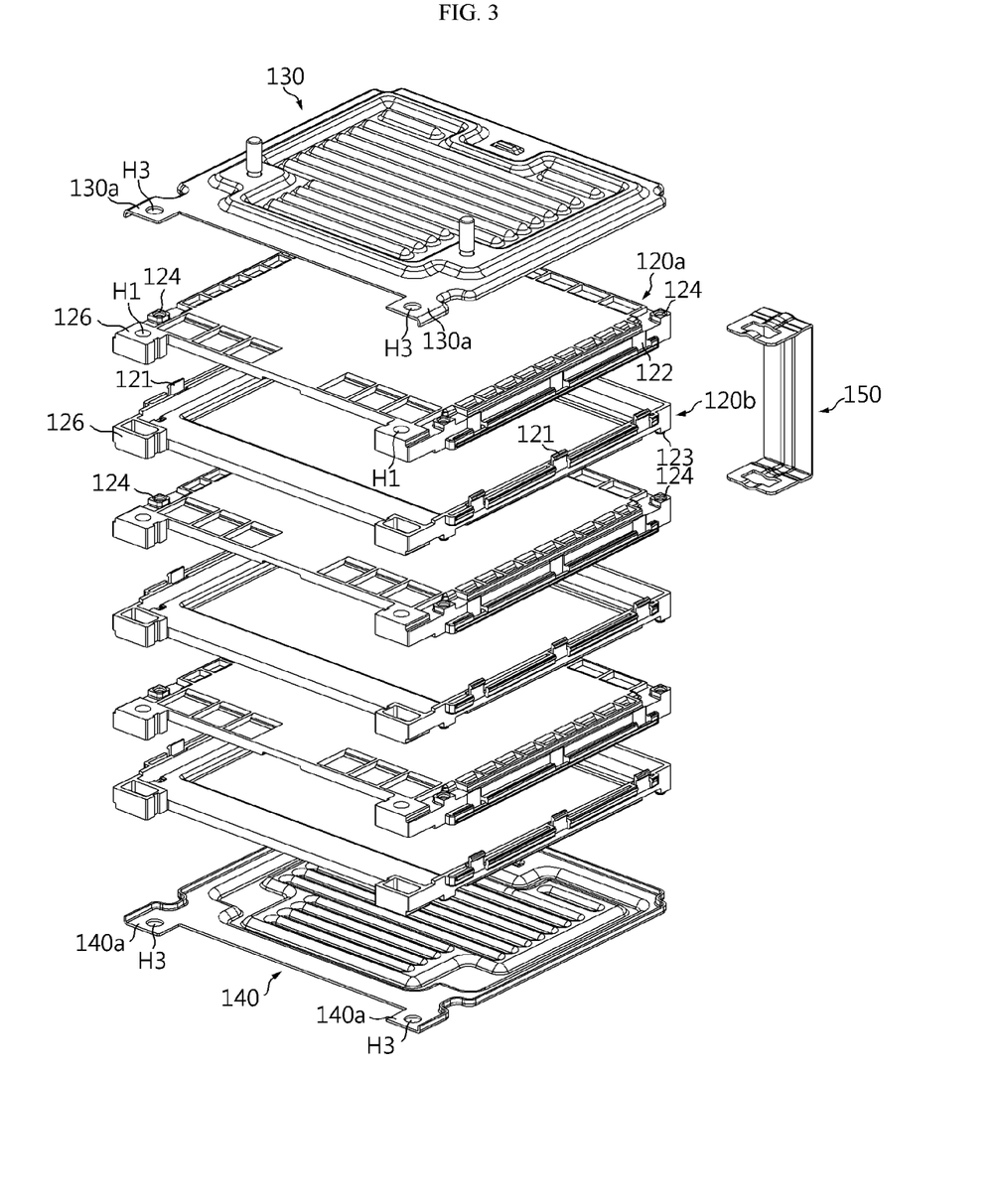
FIG. 3 is an exploded perspective view of a plurality of stacking cartridges and upper and lower end plates of FIG. 2.
Figure 4:
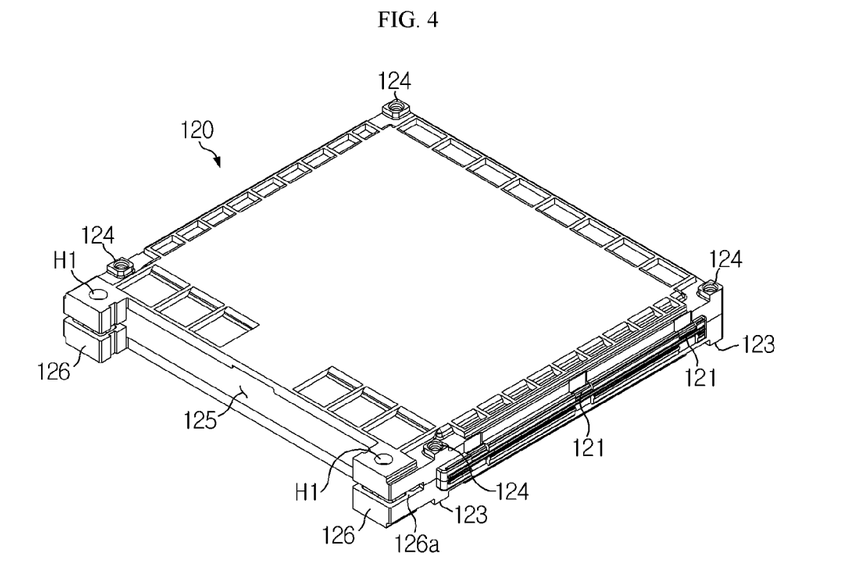
FIG. 4 is a perspective view of a stacking cartridge according to an embodiment of the present disclosure.
Figure 5:
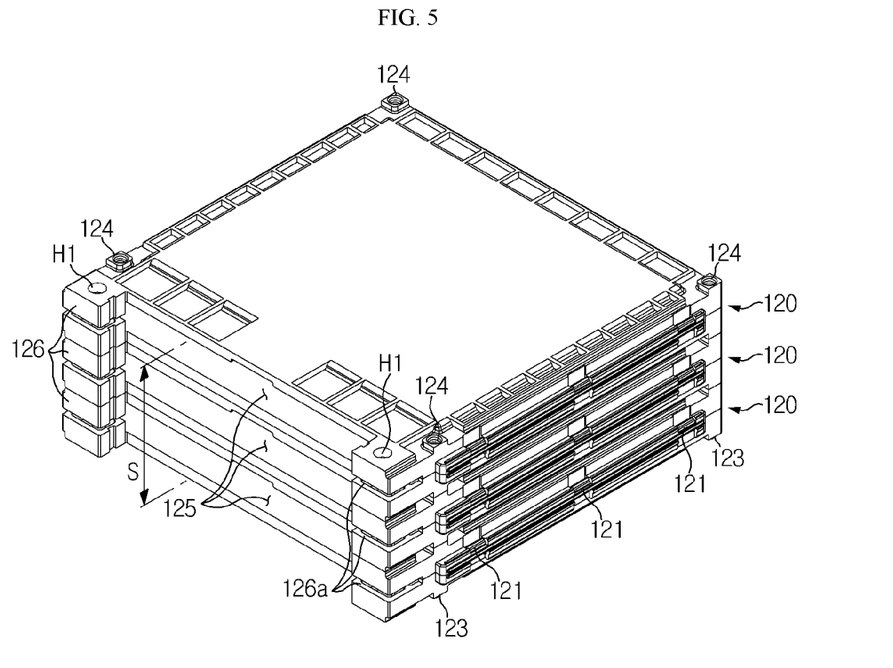
FIG. 5 is a perspective view of a plurality of stacking cartridges arranged in layers as shown in FIG. 2.
Figure 6:
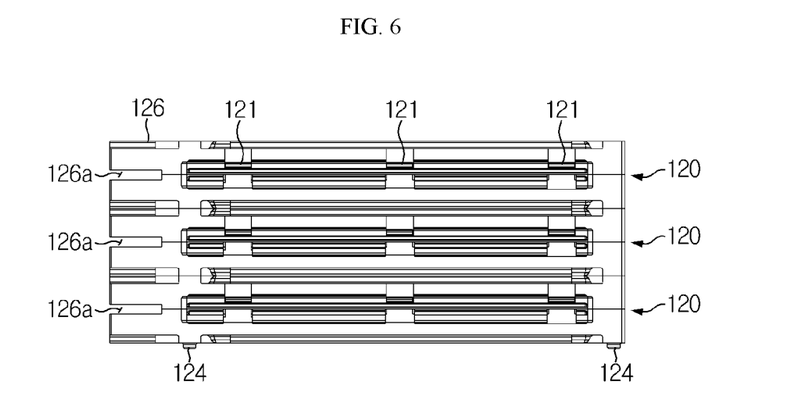
FIG. 6 is a side view of FIG. 5.

FIG. 3 is an exploded perspective view of a plurality of stacking cartridges and upper and lower end plates of FIG. 2. FIG. 4 is a perspective view of the stacking cartridge of FIG. 2. FIG. 5 is a perspective view of a plurality of stacking cartridges arranged in layers as shown in FIG. 2, and FIG. 6 is a side view of FIG. 5.

Referring to FIGS. 3 to 6, the stacking cartridge 120 may include an upper frame 120a and a lower frame 120b. The upper frame 120a and the lower frame 120b may be prepared to be capable of being assembled with each other up and down. To this end, one of the upper frame 120a and the lower frame 120a may have a hook 121, and the other one thereof may have a hooking hole 122, which is engaged with the hook 121.

For example, as shown in FIG. 3, three hooks 121 may be provided along a lengthwise direction in a side surface of an edge of the lower frame 120b on each of both opposite sides of the lower frame 120b. Three hooking holes 122, which correspond to the three hooks 121, may be provided in a side surface of an edge of the upper frame 120a on each of both opposite sides of the upper frame 120a. For example, two battery cells 110 may be stacked on a top surface of the lower frame 120b, and the upper frames 120a and 120b may be fastened to each other by the hooks 121, thereby providing one stacking cartridge 120.

The stacking cartridge 120 may have a coupling protrusion 123 at any one of an upper end portion and a lower end portion and have a coupling groove 124 corresponding to the coupling protrusion 123 at the other one thereof.

As shown in FIGS. 3 and 4 of the present embodiment, a total of four coupling protrusions 123 may be provided and directed downward from bottom surfaces of both end portions of the both opposite sides of the lower frame 120b, and a total of four coupling grooves 124 may be provided in the shape of concave grooves in top surfaces of both end portions of the both opposite sides of the upper frame (120a). A diameter of the coupling groove 124 is configured to correspond to the coupling protrusions 123.

Due to this configuration, the plurality of stacking cartridges 120 may be stably stacked by fitting the coupling protrusion 123 of one stacking cartridge 120 into the coupling groove 124 of another stacking cartridge 120. Also, an assembling position between the stacking cartridges 120 may be guided by the coupling protrusion 123 and the coupling groove 124, thereby increasing assembling easiness.

The stacking cartridge 120 may include an opening 125 on at least one side thereof. Electrode leads 111 and 112 of the battery cells 110 may be exposed to the outside of the stacking cartridge 120 by the opening 125.

For example, in the present embodiment, the opening 125 of the stacking cartridge 120 is formed only in one direction. This corresponds to a unidirectional battery cell 110 (in which a positive electrode lead is located in the same direction as a negative electrode lead). However, unlike the present embodiment, when the battery module 10 includes bidirectional battery cells 110 (in which a positive electrode lead is located in an opposite direction to a negative electrode lead), openings 125 of the stacking cartridge 120 may be formed in both front and rear directions of the stacking cartridge 120.

Particularly, the stacking cartridge 120 according to the present disclosure may have a bolt-assembling finger 126, which protrudes from at least one corner area beyond other corner areas. That is, as shown in FIGS. 3 to 6, two bolt-assembling fingers 126 may be respectively in both corner areas of the stacking cartridge 120 with the opening 125 of the stacking cartridge 120 therebetween. The bolt-assembling finger 126 may be used as a place where a bolt is assembled.

First bolt through-holes H1 through which bolts B are inserted are formed in the bolt-assembling fingers 126. In this case, upper and lower portions of the bolt-assembling fingers 126 are open, and the first bolt through-holes H1 are provided in central regions of the bolt-assembling fingers 126.

According to this configuration, after a plurality of stacking cartridges 120 are stacked, shoulder bolts B may be fastened to the bolt-assembling fingers 126 so that the plurality of stacking cartridges 120 may be simply assembled into one body.

The bolt-assembling finger 126 of the present disclosure further includes an assembly guide unit 126a. The assembly guide unit 126a may be configured in a slot shape in a horizontal direction with respect to a body of the bolt-assembling finger 126. The assembly guide unit 126a may be used as a place where the assembling plate 220 of the sensing assembly 200 to be described later is slidably engaged.

Referring to FIGS. 1 to 3, the cell cartridge assembly 100 according to the embodiment of the present disclosure may further include an upper end plate 130, a lower end plate 140, and a band plate 150.

The upper end plate 130 is a plate-shaped structure disposed on the stacking cartridge 120 located at an uppermost position, and configured to support the cell cartridge assembly 100 at a top portion of the cell cartridge assembly 100. The lower end plate 140 is a plate-shaped structure disposed under the stacking cartridge 120 located at a lowermost position, and configured to support the cell cartridge assembly at a bottom portion of the cell cartridge assembly 100. The upper and lower end plates 130 and 140 are provided in a substantially similar shape.

For example, as shown in FIG. 3, a plurality of convex patterns may be formed on surfaces of the upper and lower end plates 130 and 140. Assembling flanges 130a and 140a are respectively provided in the upper and lower end plates 130 and 140 at positions corresponding to the bolt-assembling fingers 126.

Flange through-holes H3, which communicate with the first bolt through-holes H1 and through which bolts pass, are formed in the assembling flanges 130a and 140a. A diameter of the flange through-holes H3 is formed to be substantially similar to a diameter of the bolt B.

The upper and lower end plates 130 and 140 may be configured in the form of a plate having an approximately large area and respectively disposed on and under a plurality of stacked cartridges 120 arranged in layers to cover a top portion and a bottom portion of the plurality of stacking cartridges 120.

The upper and lower end plates 130 and 140 may provide mechanical support force for the battery module 10 and protect the stacking cartridges 120 from external impacts under and on the stacking cartridges 120. Accordingly, the upper and lower end plates 130 and 140 may include a metal, such as steel, to ensure rigidity.

Referring to FIGS. 1 and 2, the band plate 150 is located on the opposite side of the sensing assembly 200 with respect to the plurality of stacking cartridges 120 arranged in layers. The band plate 150 is coupled to the upper and lower end plates 130 and 140. The band plate 150 may be provided in the form of a strap having mechanical rigidity.

Particularly, the band plate 150 of the present embodiment includes both bent ends. One end of the band plate 150 is coupled to an upper end surface of the upper end plate 130, and the other end thereof is coupled to a lower end surface of the lower end plate 140. Thus, the band plate 150 may press the plurality of stacking cartridges 120 up and down.

The band plate 150 partially absorbs external impact applied to the cell cartridge assembly 100 and inhibits deformation of the stacking cartridges 120. In particular, the band plate 150 also prevents deformation of the stacking cartridges 120 against the swelling of the battery cell 110.

Meanwhile, the sensing assembly 200 may be mounted on one side of the cell cartridge assembly 100. Particularly, the sensing assembly 200 may be mounted in a portion of the cell cartridge assembly 100 where the electrode leads 111 and 112 protrude.

The sensing assembly 200 may transmit sensing information on electrical characteristics (e.g., a voltage) of the battery cell 110 to another device (not shown) outside the battery module 10. For example, a device, such as a battery management system (BMS), may be connected to the batters module 10 and configured to control operations (e.g., a charging or discharging operation) of the battery module 10. In this case, the sensing assembly 200 may be connected to the BMS and provide the sensed voltage information of the battery cell 110 to the BMS, and the BMS may control the battery module 10 based on the sensed voltage information.

Figure 7:
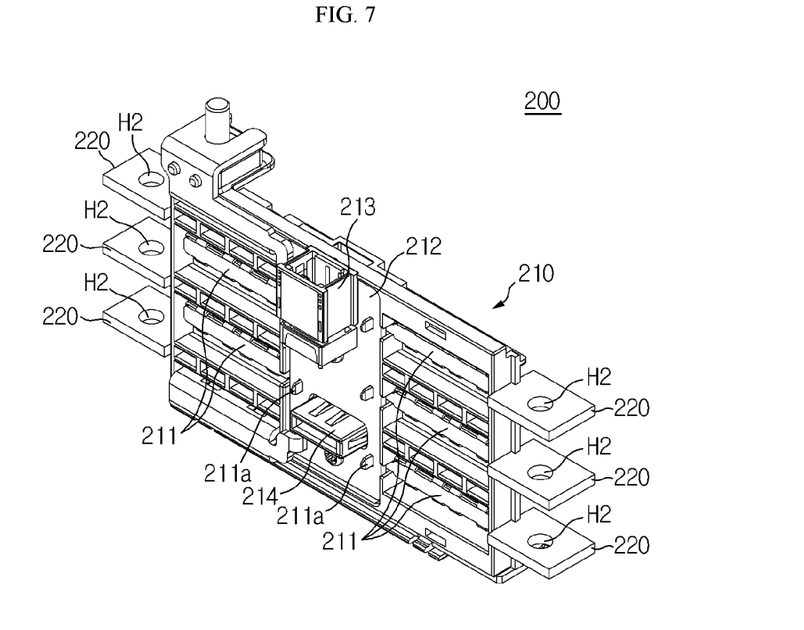
FIG. 7 is a front perspective view of a sensing assembly according to an embodiment of the present disclosure.
Figure 8:
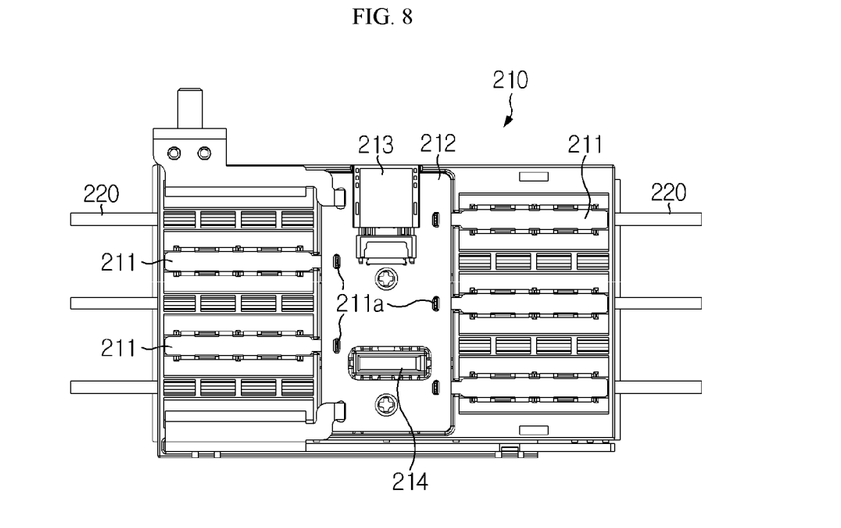
FIG. 8 is a front view of the sensing assembly of FIG. 7.

FIG. 7 is a front perspective view of a sensing assembly according to an embodiment of the present disclosure. FIG. 8 is a front view of the sensing assembly of FIG. 7, and FIG. 9 is a rear perspective view of FIG. 7.

Figure 9:
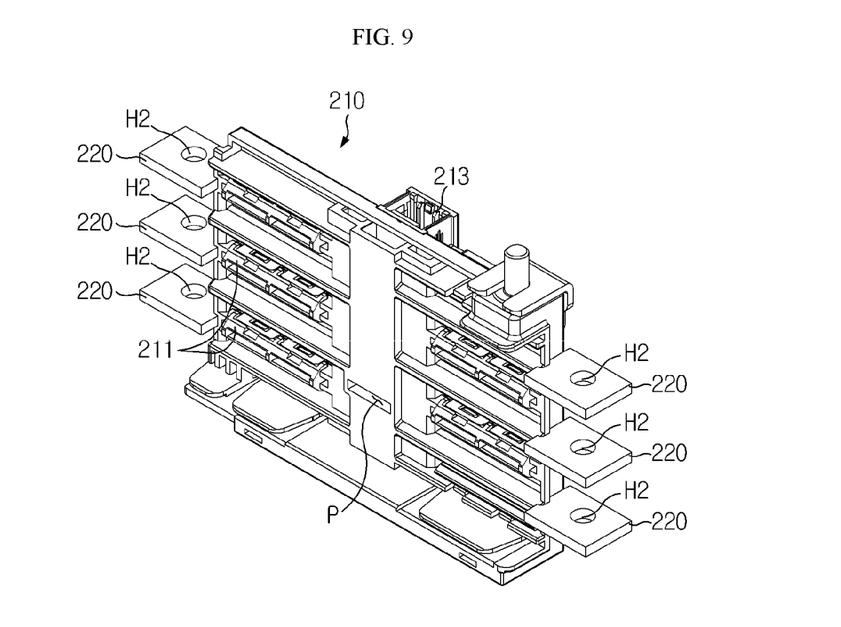
FIG. 9 is a rear perspective view of FIG. 7.

As shown in FIGS. 7 to 9, a sensing assembly 200 according to an embodiment of the present disclosure may include a sensing assembly body 210 and an assembling plate 220.

The sensing assembly body 210 is provided in the form of a plate-shaped structure and includes a plurality of sensing members. The plurality of sensing members may include a plurality of bus bars 211, a circuit board 212, and connector terminals 213.

The plurality of bus bars 211 includes an electrically conductive material, such as copper or aluminum. The plurality of bus bars 211 are in direct contact with and electrically connected to positive electrode leads or negative electrode leads of the battery cells 110 so as to sense electrical characteristics of the battery cells 110.

For example, the plurality of bus bars 211 may be individually connected to the positive electrode lead 111 and the negative electrode lead 112 of all the battery cells 110 provided in the cell cartridge assembly 100 and configured to sense both-end voltages of all the battery cells 110. One end portion of the plurality of bus bars 211 may be electrically connected to the circuit board 212.

The circuit board 212 has an internal circuit configured to allow a plurality of bus bars 211 to be independently connected to the connector terminals 213. For example, a printed circuit board (PCB) 212 in which a pattern of the internal circuit is printed may be embodied.

The connector terminals 213 correspond to terminals to which an external device (i.e., battery management system (BMS)) configured to measure a voltage of each of the battery cells 110 is connected.

Referring to FIGS. 7 and 8, the circuit board 212 may be mounted in the center of a front surface of the sensing assembly body 210. The plurality of bus bars 211 may be arranged in multiple stages on both sides of the circuit board 212 in a branched structure with the circuit board 212 therebetween. One end portion of each of the plurality of bus bars 211 is bent and inserted into the circuit board 212 from a back surface toward a front surface of the circuit board 212.

According to the configuration of the sensing assembly body 210 of the present disclosure, wiring cables may be omitted so that a wiring structure for data transmission of the battery cell 110 may be simplified. The sensing assembly 200 may be integrated so as to increase space efficiency.

The sensing assembly body 210 may further include a thermistor mounting terminal 214. The thermistor mounting terminal 214 is configured to allow a thermistor to be inserted into the battery module 10 from the outside of the battery module 10. Referring to FIGS. 7 to 9, a through hole P is prepared in the circuit board 212 and the sensing assembly body 210 and allows the circuit board 212 and sensing assembly body 210 to communicate with each other, and the thermistor mounting terminal 214 is inserted into the through hole P. That is, the circuit board 212 is mounted on the front surface of the sensing assembly body 210, and the thermistor mounting terminal 214 may be installed through front and rear surfaces of the circuit board 212 and sensing assembly body 210.

A thermistor (not shown) may be provided in a bar shape and inserted into the inside of the battery module 10 through the thermistor mounting terminal 214. The thermistor may be a semiconductor device using a phenomenon that a resistance value varies with temperature. The thermistor has a small size and is capable of measurement even at a rapid change in temperature or a fine change in temperature.

Temperature information of the battery module 10 measured by the thermistor may be transmitted to another device outside the battery module 10. For example, when a temperature is measured by the thermistor, measured temperature information may be transmitted to a BMS outside the battery module 10 and used to control the battery module 10.

The assembling plate 220 is slidably inserted into and bolt-fastened to the bolt assembling fingers 126 of the plurality of stacking cartridges 120. The assembling plate 220 may be integrally formed with the sensing assembly 200 and capable of being inserted into the assembly guide unit 126a of the bolt-assembling finger 126.

Furthermore, the assembling plate 220 includes second bolt through holes H2 that are formed through the assembling plate 220 in the vertical direction. When the assembling plate 220 is interposed between the assembly guide units 126a of the bolt assembling fingers 126, the second bolt through holes H2 may communicate with the first bolt through holes H1 provided in the bolt assembling fingers 126. In this case, the first bolt through holes H1 and the second bolt through-holes H2 may be formed to have diameters corresponding to each other.

Hereinafter, a fastening structure between the sensing assembly 200 and the cell cartridge assembly 100 will be described in further detail.

To begin with, referring to FIG. 2 of the present embodiment, the cell cartridge assembly 100 includes three stacking cartridges 120 arranged in layers. A total of six bolt-assembling fingers 126 are provided in the three stacking cartridges 120, and three six bolt-assembling fingers 126 are provided in each of both corner areas. Therefore, a total of six assembly guide units 126a are also provided, and three six assembly guide units 126a are provided in each of the both corner areas. Naturally, the scope of the present disclosure is not limited to the configuration. That is, a battery module of a higher capacity than the battery module of the present embodiment may be embodied by increasing the stacking number of battery cells and stacking cartridges.

Here, the bolt-assembling fingers 126 of the plurality of stacking cartridges 120 respectively protrude forward with respect to the openings 125, so that the openings 125 of the plurality of stacked cartridges 120 arranged in layers (i.e., a front portion of the cell cartridge assembly 100) may have an indentation S (refer to FIG. 5) having an inwardly concave shape.

The sensing assembly body 210 may be inserted into the indentation S of the cell cartridge assembly 100 with a plate surface of the sensing assembly body 210 vertically erected. According to the cell cartridge assembly 100, the sensing assembly body 210 may not protrude outside the battery module 10, so that efficiency of a peripheral space may increase and the battery module 10 may be compactly embodied.

The assembling plate 220 may be provided in a number corresponding to the number of the bolt-assembling fingers

126. For example, as shown in FIGS. 2 and 7 of the present embodiment, six assembling plates 220 may be provided to correspond to six bolt-assembling fingers 126 of the cell cartridge assembly 100. However, the number of the assembling plates 220 may be less than the number of the bolt-assembling fingers 126.

The six assembling plates 220 are provided in two lateral directions with the sensing assembly body 210 therebetween. That is, three assembling plates 220 are provided on each of left and right sides of the sensing assembly body 210, and spaced apart by a predetermined distance from one another in a height direction of the sensing assembly body 210. Also, the assembling plates 220 may correspond one-to-one to the bolt-assembling fingers 126 (more specifically, the respective assembly guide units 126*a*) in left and right corner areas of the front portion of the cell cartridge assembly 100.

The six assembling plates 220 may be inserted into six bolt-assembling fingers 126 through the assembly guide units 126*a*. In this case, the first bolt through-holes H1 may communicate with the second bolt through-holes H2. By inserting and passing a body of a shoulder bolt B into the first bolt through-holes H1 and the second bolt through-holes H2, which communicate with each other, and fastening a screw to a lower end portion of the shoulder bolt B, the sensing assembly 200 and the cell cartridge assembly 100 may be combined into a single body.

According to the configuration of the present disclosure, the sensing assembly 200 and the cell cartridge assembly 100 may be more tightly coupled so that the entire battery module 10 may operate together. Accordingly, even if vibration and impact are applied to the battery module 10, the sensing assembly 200 is not easily separated. Also, since the sensing assembly 200 and the cell cartridge assembly 100 are assembled by using a slot or in a sliding manner, assembling easiness is excellent, and a structure is less likely to be damaged during an assembling process.

Furthermore, since both sides of the sensing assembly body 210 are surrounded by the bolt-assembling fingers 126, even if external impact and vibration are applied to the battery module 10, the sensing assembly body 210 may be protected.

A battery pack according to the present disclosure may include at least one battery module 10 according to the present disclosure. In addition to the battery module 10, the battery pack according to the present disclosure may further include a case configured to accommodate the battery module 10 and various devices configured to control the charging and discharging of the battery module 10, for example, a battery management system (BMS), a current sensor, and a fuse.

The battery module 10 according to the present disclosure may be applied to vehicles, such as electric vehicles or hybrid vehicles. That is, a vehicle according to the present disclosure may include the battery module 10 according to the present disclosure.

As described above, while the present disclosure has been particularly shown and described with reference to exemplary embodiments thereof, it will be understood by those of ordinary skill in the art that it is capable of various changes and modifications without departing from the scope of the present disclosure as defined by the following claims.

In the present specification, direction-indicating terms, such as "upper", "lower", "left", "right", "front", and "back", may be used herein for ease of description to describe the present disclosure, and be used interchangeably depending on a position of an object or an observer's position.

INDUSTRIAL APPLICABILITY

The present disclosure relates to a battery module and is particularly applicable to industries related to a battery module, a battery pack in which battery modules are connected in series or parallel, and a device (e.g., an electric vehicle) driven by the battery module.

What is claimed is:

1. A battery module comprising:
a cell cartridge assembly comprising at least one battery cell and a plurality of stacking cartridges configured to respectively accommodate the at least one battery cell therein and arranged in layers in a height direction of the cell cartridge assembly; and
a sensing assembly mounted on at least one side of the cell cartridge assembly and configured to sense electrical characteristics of the at least one battery cell,
wherein each of the stacking cartridges comprises a bolt-assembling finger protruding from at least one corner area beyond other corner areas, and the bolt-assembling finger comprises an assembly guide unit provided in a slot form, and
wherein the sensing assembly comprises a sensing assembly body provided in the form of a plate-shaped structure and having a plurality of sensing members mounted thereon, and an assembling plate integrally formed with the sensing assembly body and capable of being inserted into the assembly guide unit of the bolt-assembling finger.

2. The battery module of claim 1, wherein each of the stacking cartridges comprises an opening on at least one side thereof,
the two bolt-assembling fingers protrude forwardly with respect to the opening with the opening therebetween and are respectively provided in both corner areas of the stacking cartridge so that an indentation of which at least one side surface is concave is provided in the cell cartridge assembly.

3. The battery module of claim 2, wherein the sensing assembly body is inserted into the indentation of the cell cartridge assembly with a plate surface of the sensing assembly body vertically erected,
the assembling plates are provided in plural, and the assembling plates protrude in two lateral directions with the sensing assembly body therebetween, and are spaced apart by a predetermined distance from one another in a height direction of the sensing assembly body and slidably inserted into assembly guide units of the bolt-assembling fingers.

4. The battery module of claim 1, wherein the bolt-assembling finger further comprises a first bolt through-hole into which a bolt is inserted and passed in a vertical direction, and
the assembling plate comprises a second bolt through-hole configured to communicate with the first bolt through-hole.

5. The battery module of claim 1, wherein the stacking cartridge comprises a coupling protrusion at any one of an upper end portion and a lower end portion, and comprises a coupling groove corresponding to the coupling protrusion at the other one of the upper end portion and the lower end portion.

6. The battery module of claim 1, wherein the stacking cartridge comprises an upper frame and a lower frame provided to be capable of being assembled with each other up and down, wherein any one of the upper frame and the lower frame comprises a hook, and the other thereof comprises a hooking hole corresponding to the hook.

7. The battery module of claim 6, wherein the sensing member comprises a plurality of bus bars that respectively contact the electrode leads of the battery cells, which protrude from the cell cartridge assembly, and a circuit board electrically connected to one end of each of the plurality of bus bars.

8. The battery module of claim 6, wherein the sensing member further comprises a connector terminal connected to the circuit board and to which an external device configured to measure electrical characteristics of the battery cell is connected.

9. The battery module of claim 6, wherein the circuit board is mounted in a center of a front surface of the sensing assembly body, and the plurality of bus bars are arranged in multiple stages on both sides of the circuit board in a branched structure with the circuit board therebetween.

10. The battery module of claim 9, wherein the sensing assembly further comprises a thermistor mounting terminal installed through front and rear surfaces of the circuit board and the sensing assembly.

11. The battery module of claim 1, wherein the cell cartridge assembly further comprises an upper end plate and a lower end plate configured to respectively cover an uppermost end and a lowermost end of the plurality of stacking cartridges, and a band plate provided in the form of a strap having mechanical rigidity, the band plate having one end coupled to an upper end surface of the upper end plate and the other end coupled to a lower end surface of the lower end plate.

12. A battery pack comprising the battery module of claim 1.

13. A vehicle comprising the battery module of claim 1.

* * * * *